Oct. 9, 1928.  
W. T. HULSIZER  
1,687,022  
TOOTH FOR EXCAVATING SHOVELS  
Filed July 2, 1926
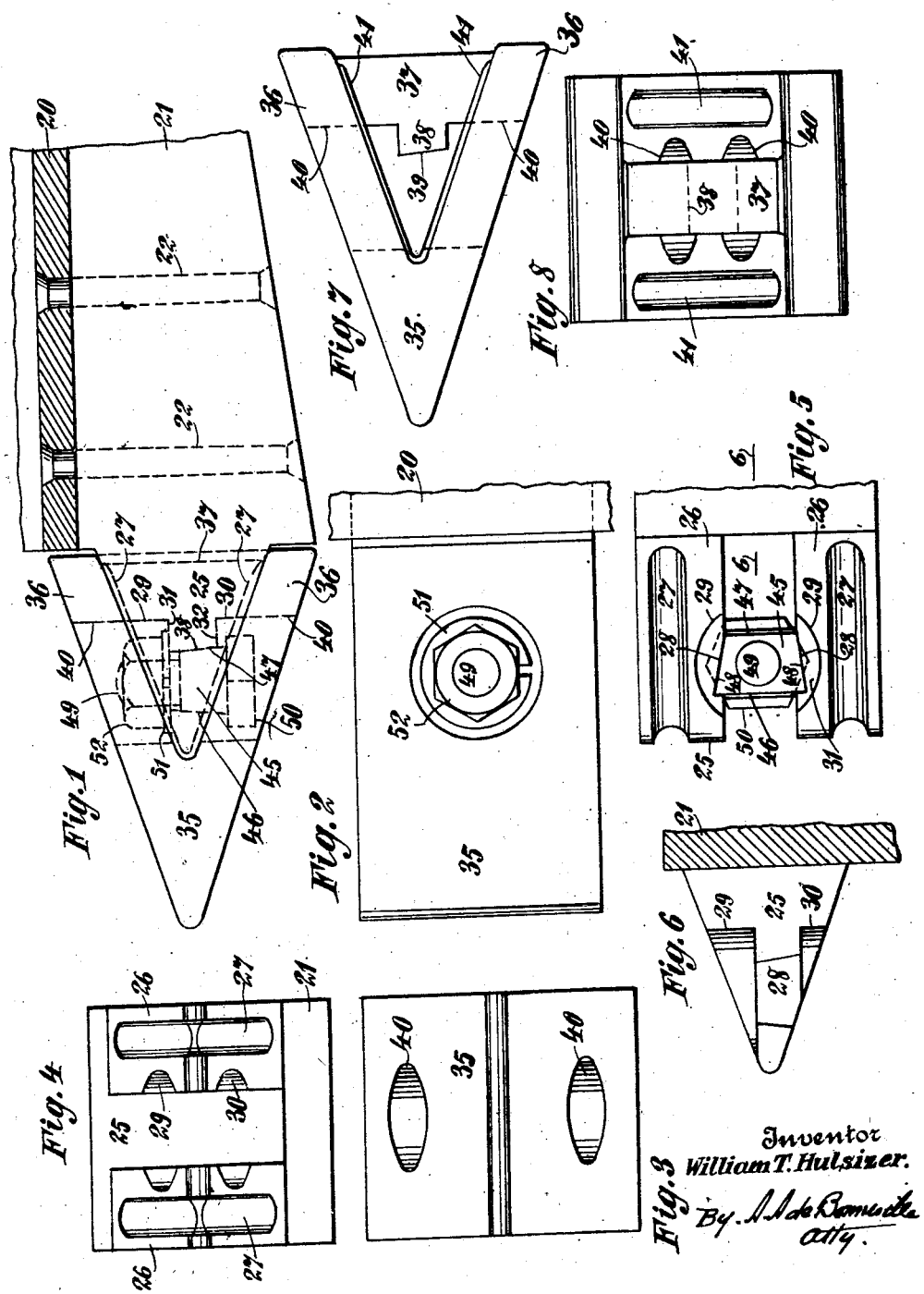
Inventor  
William T. Hulsizer.

Patented Oct. 9, 1928.

1,687,022

UNITED STATES PATENT OFFICE.

WILLIAM T. HULSIZER, OF CLINTON, NEW JERSEY.

TOOTH FOR EXCAVATING SHOVELS.

Application filed July 2, 1926. Serial No 120,031.

This invention relates to a tooth for excavating shovels.

The object of the invention is the production of a tooth, wherein the point can be easily clamped to its body portion in tight operative position, preventing any movement of the point in either a vertical or horizontal direction when clamped in place. The second object of the invention is the production of a tooth with a reversible point. The third object of the invention is the production of a point for a tooth having a brace connecting its tapering members to secure strength. The fourth object of the invention is the production of a tooth wherein the point thereof can be easily detached for replacement.

Other objects will be evident from the following description and claims.

In the accompanying drawings Fig. 1 represents the side view of a tooth exemplifying the invention attached to a shovel; Fig. 2 shows a top plan view of a fragmentary portion of the shovel; Fig. 3 indicates a front elevation of the point of the shovel; Fig. 4 represents a front view of the body portion of the tooth; Fig. 5 shows a top view of a fragmentary portion of the body of the tooth with a locking element connected thereto; Fig. 6 shows a section of Fig. 5 on the line 6, 6; Fig. 7 is a side view of the point of the tooth and Fig. 8 is a right hand side view of Fig. 6.

A sectional fragmentary portion of a shovel 20 has fastened thereto the body portion 21 of a tooth, by means of the rivets 22. The said body portion has formed therewith at its front end the tapered nose 25 comprising the similar parallel members 26. Each of the members 26 has formed therewith on each of its tapered faces the concaved longitudinal seat 27 and on its inner face the tapered bearing face 28. Similar circular cavities 29 and 30 are formed in the opposite members 26 of the nose 25 of said body portion 21. The cavities 29 are shown with the flat bottom face 31 and the cavities 30 are shown with the flat top face 32.

The point of the tooth is V shaped and indicated in its entirety by the numeral 35 and comprises the similar tapering members 36, which are connected by the central connecting brace 37, which has extending therefrom the locking lug 38 with the tapered face 39. Similar cylindrical openings 40 are formed in the members 36, and longitudinal locking projections 41 extend from the inner faces of said members 36.

A locking key 45 is indicated with the tapered front face 46 and tapered rear face 47 and tapered side faces 48. A threaded shank 49 extends from the upper end of the key 45 and a head 50 is formed with the bottom end of said key.

The point 35 is located upon the members 26 of the nose of the body portion 21, the longitudinal locking projections 41 engaging the longitudinal concaved seats 27. The key 45 is located with its tapered side faces 48 engaging the tapered bearing faces 28 of the members 26, with the tapered rear face 47, bearing against the tapered face 39 of the locking lug 38. A lock washer 51 encircles the threaded shank 49 and bears on the flat bottom face 31 of the cavity 29. A nut 52 engages the shank 49. By screwing down the nut 52, the key 45 is drawn up locking the point 35 of the tooth to its body portion 21.

The members 26 of the body portion 21 being of the same form on their outer faces and the members 36 of the point 38 being of the same form, enables the said point 35 to be reversed in position when locked to its body portion 21.

Various modifications may be made in the invention and the present exemplification is to be taken as illustrative and not limitative thereof.

Having described my invention what I desire to secure by Letters Patent and claim is:

1. In a tooth of the character described the combination of a body portion having a tapered nose, a point having tapering members located upon said nose, a connecting brace for said members, a locking lug having a tapered face extending from said brace and a key adapted to engage said nose and the tapered face of the locking lug to detachably lock said point to said nose.

2. In a tooth of the character described the combination of a body portion having a tapered nose, comprising a pair of parallel members, a tapered bearing face in each of said members, said bearing faces opposite each other, a point having similar tapered members engaging the members of the nose of said body portion, interlocking means between the parallel members of the nose and the tapered members of the point to detachably maintain them in lateral locked position and a key engaging the tapered bearing faces of the nose of the body portion of the tooth and said point to clamp the latter in position.

3. In a tooth of the character described the combination of a body portion adapted to be connected to a shovel, a tapered nose formed with the body portion comprising two parallel members, a bearing face in each of said members, said bearing faces opposite each other, a cavity with a flat bottom face extending downwardly in each of the members of the nose joining with its bearing face, a second cavity in line with the first cavity extending upwardly in each of the members of the nose and joining with its bearing face, a point having similar tapered members engaging the members of the nose of said body portion, a connecting brace connecting the tapered members of the point, a locking lug having a tapered face extending from said connecting brace, a locking key engaging the bearing faces of the nose of the body portion and bearing against the bearing face of said locking lug, a threaded shank for said locking key and a nut to clamp the key in place.

4. In a tooth of the character described the combination of a body portion adapted to be connected to a shovel, a tapered nose comprising a pair of similar parallel members formed with said body portion, a point having similar tapered members detachably locked to the members of the nose to maintain them in lateral locked position, bearing faces formed with the members of the nose of the body portion, a cavity having a flat face in the members of the nose at the ends of said bearing faces, a locking lug formed with the point, a locking key engaging the bearing faces of said nose and engaging the locking lug of said point, a threaded shank for said key, a nut for said shank located in a pair of the cavities at the ends of said bearing faces and a lock washer between said nut and the flat face of the cavity in which it is located.

In testimony whereof I affix my signature.

WILLIAM T. HULSIZER.